United States Patent
Dennis

(10) Patent No.: US 7,150,431 B2
(45) Date of Patent: Dec. 19, 2006

(54) ELECTRICAL GENERATOR FLUID-FLOW-COOLANT FILTRATION

(75) Inventor: Michael R. Dennis, Scappoose, OR (US)

(73) Assignee: MJD Innovations, L.L.C., Scappoose, OR (US)

( * ) Notice: Subject to any disclaimer, the term of this patent is extended or adjusted under 35 U.S.C. 154(b) by 0 days.

(21) Appl. No.: 10/757,880

(22) Filed: Jan. 14, 2004

(65) Prior Publication Data

US 2005/0178891 A1 Aug. 18, 2005

(51) Int. Cl.
 *B64D 31/00* (2006.01)
(52) U.S. Cl. .................................... 244/53 R
(58) Field of Classification Search ............. 244/53 B, 244/57, 53 R, 53 A; 454/76, 74, 82; 60/453, 60/454
See application file for complete search history.

(56) References Cited

U.S. PATENT DOCUMENTS

| | | | | |
|---|---|---|---|---|
| 991,572 A * | 5/1911 | Weisenstein | ................ | 55/480 |
| 2,087,688 A * | 7/1937 | Johnson | ................ | 55/486 |
| 2,352,790 A * | 7/1944 | Jordan | ................ | 244/130 |
| 2,810,534 A * | 10/1957 | Fandeux | ................ | 244/58 |
| 3,386,688 A * | 6/1968 | Deodat | ................ | 244/53 R |
| 3,705,775 A * | 12/1972 | Rioux | ................ | 417/411 |
| 3,834,161 A * | 9/1974 | Quigley et al. | ................ | 60/244 |
| 3,950,157 A * | 4/1976 | Matney | ................ | 55/490 |
| 3,957,230 A * | 5/1976 | Boucher et al. | ................ | 244/53 R |
| 4,130,258 A * | 12/1978 | Fox | ................ | 244/58 |
| 4,158,449 A * | 6/1979 | Sun et al. | ................ | 244/136 |
| 4,385,912 A * | 5/1983 | Parrick et al. | ................ | 55/329 |
| 4,436,481 A * | 3/1984 | Linder | ................ | 415/119 |
| 4,439,104 A * | 3/1984 | Edmonds | ................ | 415/161 |
| 4,531,356 A * | 7/1985 | Linder | ................ | 60/772 |
| 4,537,608 A * | 8/1985 | Koslow | ................ | 55/337 |
| 4,704,143 A * | 11/1987 | Percy | ................ | 96/421 |
| 4,905,511 A * | 3/1990 | Reinhold | ................ | 73/168 |
| 5,011,519 A * | 4/1991 | Maeda | ................ | 96/409 |
| 5,049,172 A * | 9/1991 | Shary et al. | ................ | 55/495 |
| 5,060,469 A * | 10/1991 | Klaass et al. | ................ | 60/773 |
| 5,125,940 A * | 6/1992 | Stanhope et al. | ................ | 55/385.3 |
| 5,343,778 A * | 9/1994 | Romero et al. | ................ | 74/661 |
| 5,373,691 A * | 12/1994 | Gardner et al. | ................ | 60/779 |
| 5,408,821 A * | 4/1995 | Romero et al. | ................ | 60/778 |
| 5,480,464 A * | 1/1996 | De Villiers et al. | ................ | 55/320 |
| 5,655,359 A * | 8/1997 | Campbell et al. | ................ | 60/772 |
| 5,662,292 A * | 9/1997 | Greene et al. | ................ | 244/53 B |
| 6,092,360 A * | 7/2000 | Hoag et al. | ................ | 60/783 |
| 6,179,890 B1 * | 1/2001 | Ramos et al. | ................ | 55/482 |
| 6,247,668 B1 * | 6/2001 | Reysa et al. | ................ | 244/58 |

(Continued)

OTHER PUBLICATIONS

Sky Geek, http://store.yahoo.com/stylespilotship/ba5110.html.*

(Continued)

*Primary Examiner*—Teri Pham Luu
*Assistant Examiner*—Stephen A Holzen
(74) *Attorney, Agent, or Firm*—Jon M. Dickinson PC; Robert D. Varitz PC

(57) ABSTRACT

A ventilating and particle-filtering airflow system, and related methodology, for managing the flow of air to the brush region of an on-board aircraft (vehicle) electrical generator. Conduit structure collects intaken air during aircraft (vehicle) engine operation, filters this air to capture and prevent the passage of particles, and directs filtered airflow to that brush region. Water drainage is provided for in a region near where filtering takes place. The filtered airflow is substantially the only airflow admitted to this region.

6 Claims, 1 Drawing Sheet

U.S. PATENT DOCUMENTS

| | | | |
|---|---|---|---|
| 6,293,494 B1* | 9/2001 | Scherer et al. | 244/53 B |
| 6,296,957 B1* | 10/2001 | Graage | 429/12 |
| 6,349,899 B1* | 2/2002 | Ralston | 244/53 B |
| 6,450,447 B1* | 9/2002 | Konrad et al. | 244/53 R |
| 6,475,255 B1* | 11/2002 | Walker, Jr. | 55/315 |
| 6,550,718 B1* | 4/2003 | Maehara | 244/53 R |
| 6,565,035 B1* | 5/2003 | Kim et al. | 244/1 R |
| 6,595,742 B1* | 7/2003 | Scimone | 415/121.2 |
| 6,651,929 B1* | 11/2003 | Dionne | 244/57 |
| 6,755,879 B1* | 6/2004 | Watvedt | 55/323 |
| 6,824,582 B1* | 11/2004 | Wilson | 55/385.3 |
| 6,840,479 B1* | 1/2005 | Przygoda et al. | 244/58 |
| 6,901,737 B1* | 6/2005 | Schnoor | 60/39.83 |
| 6,942,181 B1* | 9/2005 | Dionne | 244/57 |
| 2003/0033798 A1* | 2/2003 | Dickau | 60/226.1 |
| 2003/0080244 A1* | 5/2003 | Dionne | 244/57 |
| 2003/0132344 A1* | 7/2003 | Johnson et al. | 244/118.5 |
| 2004/0112020 A1* | 6/2004 | Wilson | 55/385.3 |
| 2005/0224635 A1* | 10/2005 | Hein et al. | 244/10 |

OTHER PUBLICATIONS

Auxiliary Power Unit, Wikipedia, the free encyclopedia; http://en.wikipedia.org/wiki/Auxiliary_power.unit.*

Nims, Robert; Armor-Plated Auxiliary Power "Mechanical Engineering", 1995.*

* cited by examiner

ELECTRICAL GENERATOR FLUID-FLOW-COOLANT FILTRATION

BACKGROUND AND SUMMARY OF THE INVENTION

This invention relates to management of the flow of coolant fluid (typically air) to an electrical generator in a vehicle, and in particular to the filtering of such flow which is directed ultimately to the sliding-contact electrical interface region, or zone, in such a generator. While the invention is believed to have applicability in a number of different vehicle settings, a preferred and best mode embodiment of, and manner of practicing, the invention are described herein generally in the context of aircraft, and more particularly in the context of a specific aircraft model wherein the invention has been found to offer significant utility.

In this context, a problem has existed with regard to the operation of certain aircraft relating to unexpectedly early, catastrophic failure of on-board electrical generators—a failure which potentially can be quite dangerous. Not only that, such generators, i.e., those employed in aircraft, can be very expensive pieces of equipment, and a catastrophic failure almost inevitably leads to a requirement for wholesale, costly replacement. The magnitude of this expense problem multiplies appreciably where an aircraft employs more than one electrical generator.

The specific failure herein being referred to involves catastrophic wear in what can be thought of as the electrical sliding-contact zone in a generator of the type mentioned—the zone involving the contact interface between brushes and a commutator, or between brushes and rings. A normal operating condition which is expected in this region is relatively long-term modestly progressive wear of the brushes—components which are expected to require replacement only occasionally, and replacement at a relatively low cost. What is definitively not expected is rapid, noticeable wear of a commutator or rings, let alone early catastrophic wear of these components which are usually and decidedly not intended to require major repair or replacement during the normal, expected working lifetime of a generator. Even more strikingly puzzling is the occurrence of such wear under circumstances wherein there is little evidence of brush wear. Yet, this is exactly the startling manifestation which characterizes the issue to which the present invention is directed.

Until the making of the discovery which has led to the creation of the present invention, experts were baffled by the mentioned wear problem, and indeed even more baffled by the fact that none could discern the cause of the problem. Deciphering of the problem was, to say the least, not intuitive.

Discovery came to me eventually by my taking a very close look at the substantially "non-worn" brushes. This look ultimately enabled me to uncover the culprit. Embedded in the contact face of each examined brush was a dense population of tiny abrasive grit whose presence, I soon determined, effectively reversed the intended, normal wear behavior of the electrical sliding-contact interface region in the failed generator which I was examining. The brushes, with this "illusive" embedded grit in place, were effectively acting in generators like abrader tools—grinding and machining away the working surface(s) of associated commutators/rings. Further examination and contemplation revealed that the primary source of this grit was engine-exhaust particulate content which found its way into the flow of coolant air (fluid) directed toward the contact interface region of the brushes.

Accordingly, and in response to these discoveries, proposed by the present invention is a special ventilation, or coolant, fluid-flow management system and methodology which effectively eliminate these discovered exhaust-grit problems.

Further elaborating, in the operating environment of an aircraft, and with the present invention installed and operating, when the engine is running, and the aircraft is flying, an air intake collects an inflow of air and feeds it into the intake end of a fluid conduit system, the discharge end of which (or ends if more than one electrical generator is/are involved) is/are tightly coupled to (via a fluid-flow connection which, as shown in FIG. 2 of the drawings herein, closes upon) the electrical sliding-contact (brush, etc.) zone(s) in the generator(s). Intermediate the intake and discharge ends of the conduit system, in accordance with the invention, is a filter, or a filter structure, which blocks the passage of harmful grit, such as exhaust grit, which may be present in this air flow. Additionally, upstream from this filter structure is an air-flow expansion chamber which acts to retard air-flow velocity, and to expand the cross-sectional area of this retarded flow, thus to improve filtering action. Adjacent the base of the filter structure is a gravity-functioning trap and drain which collects and discharges moisture in the fluid flow adjacent the filter structure.

Installation and operation of this system of the invention effectively eliminates the catastrophic wear and failure problem to which the invention is addressed.

These and other important features and advantages which are offered by the structure and methodology of the present invention will become more fully apparent now as the description which shortly follows is read in conjunction with the accompanying drawings.

DETAILED DESCRIPTION OF THE INVENTION

Figure 1:
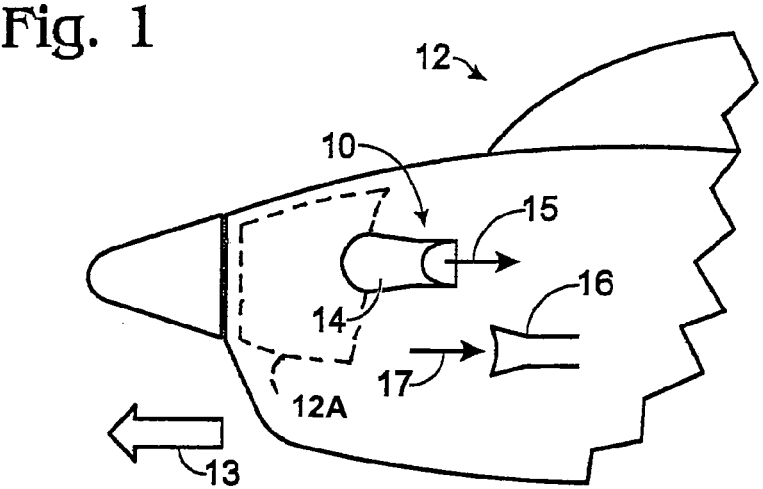
FIG. 1 is a simplified, fragmentary side-elevation (from the outside) of the nose engine compartment of an aircraft which is equipped with a fluid-flow management system constructed to function in accordance with a preferred and best-mode embodiment of, and manner of practicing, the present invention.
Figure 2:
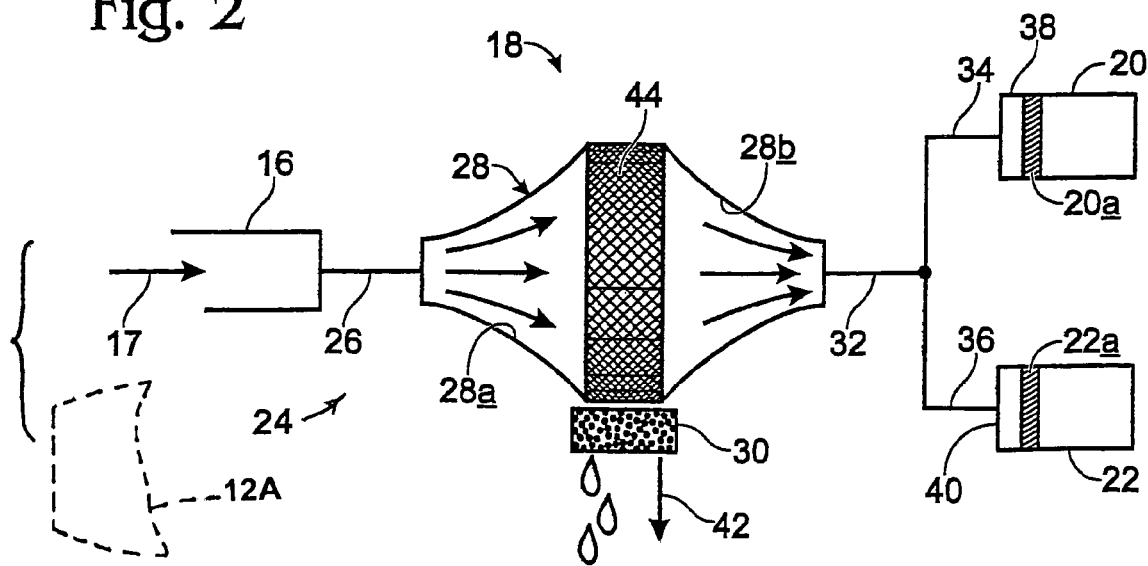
FIG. 2 is a schematic illustration of the fluid-flow management system which is installed in the aircraft of FIG. 1.

Turning now to the drawings (both figures), indicated generally at 10 in FIG. 1 is the nose engine compartment of an aircraft 12 in which a preferred and best mode embodiment of the invention has been installed (the engine is shown fragmentarily and schematically in dashed lines at 12A in FIGS. 1 and 2). This embodiment implements the methodology of the invention. As was mentioned earlier, while the present invention may well have utility in various different kinds of vehicles, it has been found to furnish significant utility in a particular aircraft model, and thus is principally illustrated and described herein in such an aircraft. This aircraft is a Pilatus model PC-12 aircraft, and accordingly that specific model of aircraft is referred to herein for the purpose of disclosure and illustration of the invention.

Exposed on the outside of the engine housing provided for nose compartment 10 in FIG. 1 are an engine exhaust outlet 14. Disposed rearwardly thereof (to the right in FIG. 1), there is also provided an air-flow inlet, or intake, 16. Flight direction for aircraft 12 is indicated by an arrow 13, exhaust direction by an arrow 15, and airflow intake direction by an arrow 17.

Intake 16 is coupled to an on-board ventilating air-flow management system constructed in accordance with the present invention. This system is generally indicated at 18 in FIG. 2. In aircraft 12, system 18 provides airflow management for two electrical generators (or generating devices) shown generally at 20, 22 in FIG. 2. The specific downstream location in nose 10 of air intake 16 relative to exhaust outlet 14 is not a configuration dictated by the present invention. Rather, it is dictated by the particular manufacturing architecture which has been chosen by the maker of the aircraft model mentioned above. It should be understood that the system and methodology of the present invention are not limited to this specific aircraft model, and are useful no matter what the engine-exhaust/air-intake geometry turns out to be. The location of air intake 16 is referred to herein as being functionally upstream from the locations of generators 20, 22.

Looking specifically at FIG. 2, system 18 further includes a fluid-flow conduit structure 24, which, as illustrated herein, includes (a) an intake conduit section 26 which defines an intake end in this system, and which is fluid coupled to air intake 16, (b) a flow velocity-modifying structure 28 having a flow-expansion chamber, or plenum, 28a coupled to conduit section 26, and a flow contraction chamber, or plenum, 28b, (c) a gravity-operable liquid trap and drain structure 30 disposed adjacent the base of structure 28 intermediate chambers 28a, 28b, and (e) a pair of discharge conduit sections 34, 36 which collectively define a discharge end (or ends) for the conduit structure, and which interconnect conduit section 32 and generators 20, 22, respectively. Specifically, conduit sections 34, 36 couple ventilating airflow through suitable connectors 38, 40, respectively, to the brush regions, also called the electrical sliding-contact zones, 20a, 22a, respectively in generators 20, 22. Zones 20a, 22a are shown as shaded regions in FIG. 2. Connectors 38, 40 may be of any suitable design appropriate to the configurations of the generators, and do not form part of the present invention. In the absence of connectors 38, 40 which closes upon zones 20a, 22a, these zones, undesirably, would be nominally exposed to otherwise uncontrolled, un-grit-filtered airflow. Closure of connections 38, 40 on zones 20a, 22a, respectively, in addition to being discussed herein is illustrated graphically at the right side of FIG. 2.

Disposed within structure 28, just above trap and drain structure 30, which drains liquid to the outside of aircraft 12 as indicated by arrow 42, is a filter, or filter structure, 44. This filter is preferably structured to block the passage into conduit section 32 of substantially all particles. The specific structure of the filter is conventional, and is not part of the present invention. A filter structure which has been found to work well in the specific aircraft mentioned above is a foam filter made by Brackett Aero Filters, Inc., of Kingman, AZ, Model No. BA-5110.

With this arrangement as just described, substantially all ventilating airflow which is provided to zones 20a, 22a is delivered by system 18, and through filter 44, and is then close-coupled to these zones through connections 38, 40.

Freely choosable by one implementing the present invention is the specific location for filter 44. Cleaning and/or replacing of a filter is accommodated by the fact that structure 28 is selectively openable (in any suitable manner). Expansion of airflow in chamber 28a to slow down airflow velocity, and to enlarge the cross-sectional area of that flow, immediately upstream from the filter aids by causing airflow to spread out across a broad filtration surface, thus to improve filtration effectiveness and operational filter lifetime. Gravity liquid trap and drain structure 30 discharges collected moisture/liquid downwardly through an appropriate drain structure (not shown) disposed on the underside of aircraft nose 10.

As stated earlier herein, the system of this invention, and the clearly understandable methodology which it provides, effectively eliminate the serious catastrophic failure problem previously described herein. The system is quite simple in construction, and can be quite inexpensive in its installation and implementation. It can very easily be incorporated not only in new construction, but also as retrofit structure in an existing aircraft.

The methodology of the invention can be described as (a) intaking a flow of air at a location which is functionally upstream from an electrical generator in an aircraft, (b) filtering the thus intaken airflow to block the passage of entrained solids (particles), and (c) directing the filtered airflow in a close-coupled manner into the electrical sliding-contact zone of the electrical generator (or generators) in the aircraft, whereby that particle-and-grit-filtered flow, as a consequence of such close-coupling, provides substantially all of the ventilating air-flow which enters that zone. Where the word "aircraft" is employed herein, it should be understood to include other forms of vehicles wherein the problem addressed by the present invention may exist.

While a preferred and best mode embodiment of, and manner of practicing, the invention have thus been described and illustrated herein, it is appreciated that variations and modification may be made without departing from the spirit of the invention.

I claim:

1. An on-board, ventilating airflow management system dedicated for use in operative association with the electrical sliding-contact zone in an aircraft rotary electrical generating device, said system, in operative condition, comprising
    an air intake (a) spaced from the electrical generating device and from the aircraft engine, (b) independent of the aircraft engine and (c) disposed to intake a flow of air under circumstances with the aircraft engine operating,
    elongate fluid-flow conduit structure having (a) an intake end disposed adjacent said air intake for receiving an airflow therefrom, (b) a discharge end including a fluid-flow connector which closes upon the mentioned electrical sliding-contact zone, whereby said discharge end, via said connector, is tightly coupled to said electrical sliding-contact zone for directing thereinto, substantially solely, all airflow, and only from that which is received at the conduit structure's said intake end, and (c) a fluid-flow path extending between and communicating with said intake and discharge ends, and
    particulate filter structure operatively disposed in said conduit structure's said fluid-flow path, intermediate said intake and discharge ends, adapted to prevent particle passage through said connector into the operatively associated electrical sliding-contact zone.

2. The system of claim 1, wherein said conduit structure, upstream in said path from said filter structure, includes a velocity-modifying flow-expansion chamber which reduces airflow velocity.

3. The system of claim 1, wherein said conduit structure, intermediate it's said intake and discharge ends further includes liquid trap and drain structure.

4. The system of claim 3, wherein said trap and drain structure is gravity operated.

5. The system of claim 2, wherein said conduit structure, adjacent the location of said filter structure, includes liquid trap and drain structure.

6. A system in an aircraft comprising an electrical generating device, an electrical sliding-contact zone in said device, an air intake spaced from said device, and disposed to intake a flow of air under circumstances with the aircraft engine operating, fluid-flow conduit structure having (a) an intake end disposed adjacent said air intake for receiving an airflow therefrom, (b) a discharge end including a fluid-flow connector which closes upon the mentioned electrical sliding-contact zone, whereby said discharge end, via said connector, is located adjacent and tightly coupled to said electrical sliding-contact zone for directing thereinto, substantially solely, all airflow, and only that which is received at the conduit structure's said intake end, and (c) a fluid-flow path extending between and communicating with said intake and discharge ends, and particulate filter structure operatively disposed in said conduit structure's said fluid-flow path intermediate said intake and discharge ends, adapted to prevent particle passage through said connector into said electrical sliding-contact zone.

* * * * *